United States Patent [19]

Ragland

[11] 4,357,618
[45] Nov. 2, 1982

[54] ELECTROSTATIC IMAGING APPARATUS

[75] Inventor: Evan L. Ragland, Atherton, Calif.

[73] Assignee: Algographic Associates, Pleasanton, Calif.

[21] Appl. No.: 102,918

[22] Filed: Dec. 12, 1979

Related U.S. Application Data

[63] Continuation-in-part of Ser. No. 951,400, Oct. 16, 1978.

[51] Int. Cl.³ ............................................ G03G 15/08
[52] U.S. Cl. ................................ 346/159; 346/153.1; 178/30
[58] Field of Search ........... 346/153, 155, 159, 110 V, 346/153.1; 178/30

[56] References Cited

U.S. PATENT DOCUMENTS

| | | | |
|---|---|---|---|
| 3,725,951 | 4/1973 | McCurry | 346/159 |
| 3,979,757 | 9/1976 | Kilby et al. | 346/155 |
| 4,123,762 | 10/1978 | Tomita et al. | 346/155 |
| 4,137,537 | 1/1979 | Takahashi et al. | 346/159 |

Primary Examiner—Marshall M. Curtis
Attorney, Agent, or Firm—Flehr, Hohbach, Test, Albritton & Herbert

[57] ABSTRACT

An electrostatic imaging process uses either a moving belt or a rotating drum with an insulative or dielectric layer backed by a conductive layer. A matrix of writing styli are used to charge the dielectric layer which are ionized air jets. After the image is developed by a toner, the toner is heated so that it will be concurrently transferred and fixed to the paper sheet.

7 Claims, 12 Drawing Figures

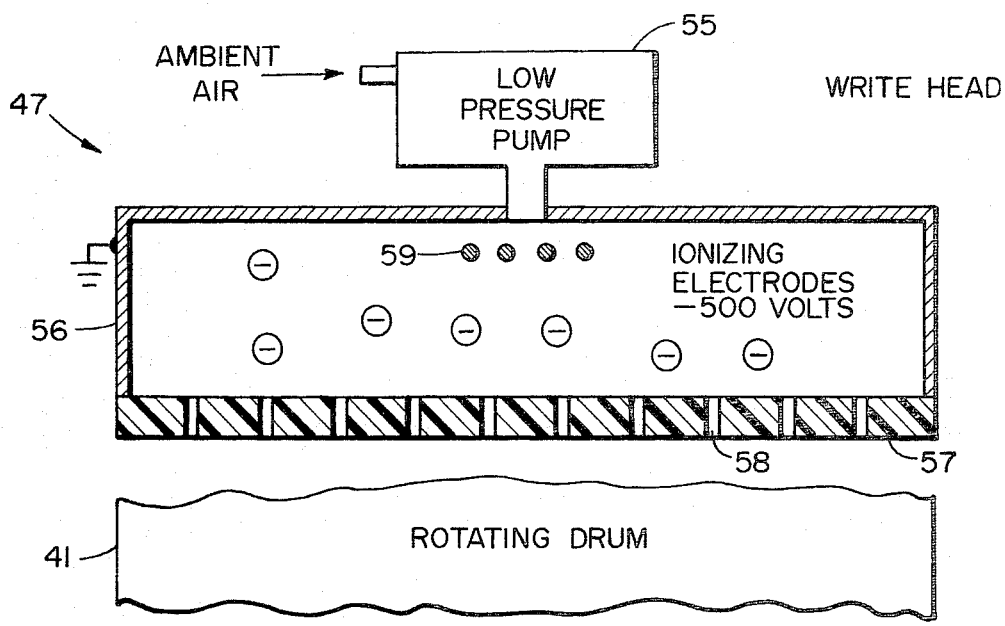
FIG. 8
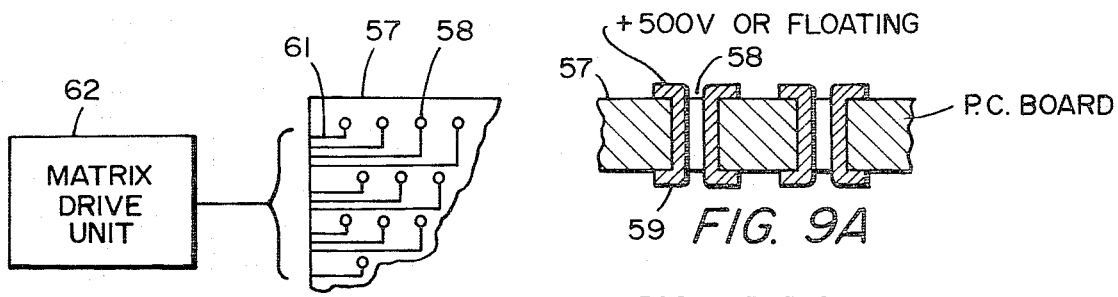
FIG. 10     FIG. 9A
FIG. 9B
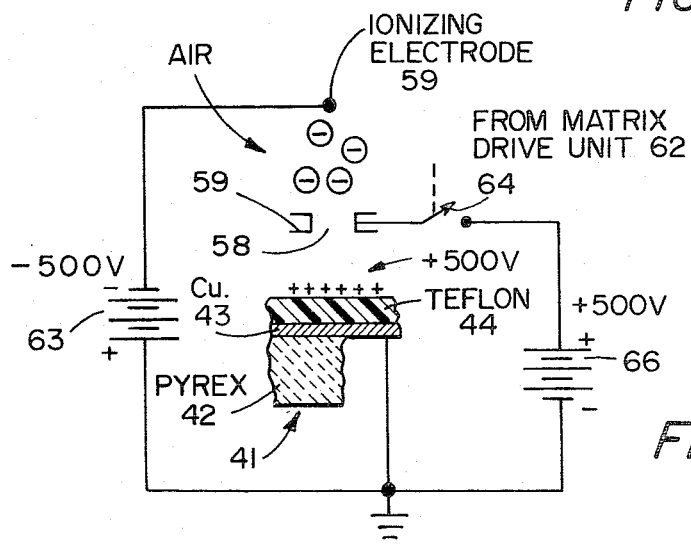
FIG. 11

ELECTROSTATIC IMAGING APPARATUS

The present invention is a continuation in part of application Ser. No. 951,400 filed Oct. 16, 1978. It is directed to electrostatic imaging apparatus and more particularly when such apparatus is used as an offset printing press.

Where relatively small numbers of pieces of material are to be printed or where a great variety of different pieces of material are to be printed, standard offset printing techniques, for example even using the newer plastic plates, are too expensive. In addition they are complicated and time comsuming. This is true, for example, where it is desired to print labels of different types, forms of even address labels.

Xerographic printing techniques as for example shown in U.S. Pat. No. 3,937,572 where a selenium of photoconductive drum is charged and then this charge is transferred inductively to an insulative film rotating over the selenium drum is an expensive and complicated apparatus and requires substantial maintenance.

It is, therefore, a general object of the present invention to provide an improved offset printing press.

In accordance with the above object there is provided an electrostatic imaging apparatus comprising a continous member having a conductive layer overlaid with an insulative layer which is capable of holding an electrostatic image on its surface. Means are provided for moving the member. Writing stylii means are in close proximity to the continous member for creating said electrostatic image on the insulative layer. Toner supply means for developing the electrostatic image on said insulative layer are also supplied, as well as means for concurrently transferring and fixing said developer image to a sheet record medium.

FIG. 8 is a simplified cross-sectional view of the writing portion of FIG. 7;

FIGS. 9A and 9B are two enlarged detailed alternative structures for a portion of FIG. 8;

FIG. 10 is a diagrammatic view of a circuit used for controlling the portions of FIGS. 9A and 9B; and FIG. 11 is a circuit schematic showing the operation of the embodiment of FIG. 7.

Figure 1:
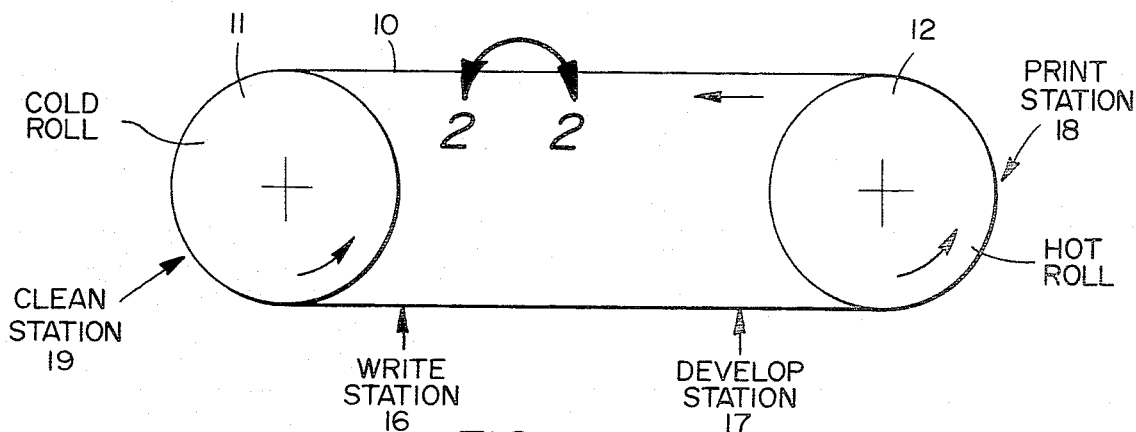
FIG. 1 is a very simplified elevational view of apparatus embodying the invention.
Figure 2:
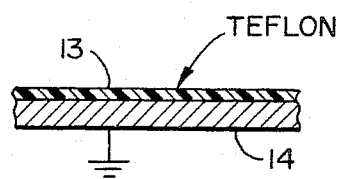
FIG. 2 is a cross-sectional view taken along the line 2—2 of FIG. 1.

Referring now to FIG. 1, this illustrates the invention in somewhat schematic format where a moving belt 10 is mounted for rotation around rollers 11 and 12 in the direction indicated by the arrows. The belt as shown by the cross-sectional view of FIG. 2 is capable of holding electrostatic charge since it has a thin layer of dielectric material 13 such as TEFLON (a trademark) coated on a base layer 14 of conductive material such as stainless steel. Typical dimensions are 0.002 inches for the dielectric coating 13 and 0.020 inches for the conductive layer 14. Layer 12 is grounded by any convenient means.

Referring again to FIG. 1, the following steps are required to produce an electrostatic final image on a sheet record medium such as paper. First, at a write station 16 a charge pattern is created on belt 10. Then at develop station 17 this charge pattern is developed by attracting charged toner particles to the moving belt. Roll 12 is heated to thereby heat the belt and paper and the toner is transferred to a record medium at the print station 18, such as paper. The belt is cooled by passing it over cold roll 11 and cleaned at clean station 19 where the printing process is again repeated.

Figure 3:
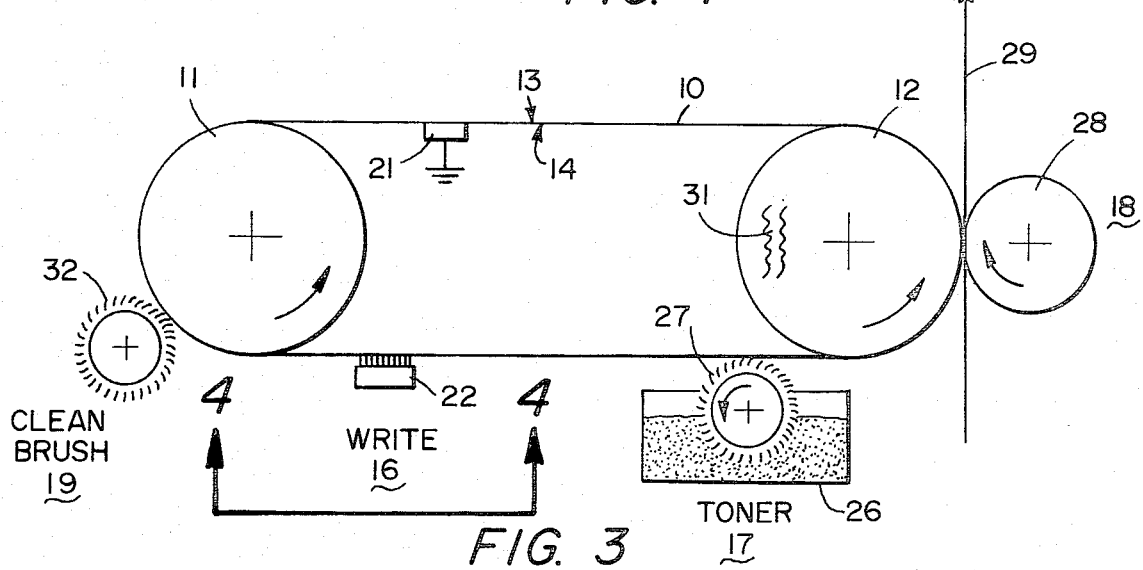
FIG. 3 is a more detailed view of the apparatus of FIG. 1.

FIG. 3 illustrates the schematic form of the invention of FIG. 1 in much greater detail. Belt 10 of course whose cross-section is shown in FIG. 2, is selected so that its thermal mass is low making it possible to rapidly change its temperature between the hot roll 12 and the cold roll 11. And, in addition the thin belt can be made to conform to rolls having a reasonable radius.

The dielectric material and specifically TEFLON (trademark) is selected because of its characteristics of stability at high temperature, a low coefficient of adhesion compared to the record medium which in this case is paper, its good dielectric characteristics, and its wear resistance. In addition, the thickness of the coating of, for example, 0.002 inch is such that it provides a good resolution since charge dispersion is minimal.

With respect to the metal base 14 of belt 10 the stainless is selected because of its characteristic of good electrical conductivity, high tensile strength and its resistance to oxidation. In addition, it would be laser welded to provide for an invisible seam. In FIG. 3, in order to ground the stainless steel base 14 a grounded brush 21 is illustrated. However, roller 11 could equally be grounded.

Figure 4:
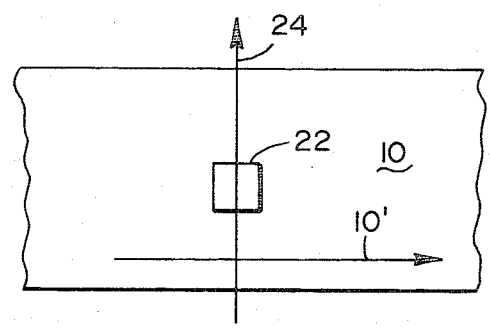
FIG. 4 is a simplified view taken along the line 4—4 of FIG. 3.
Figure 5:
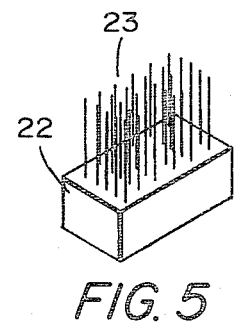
FIG. 5 is an enlarged perspective view of a portion of FIG. 3.

Write station 16 actually consists of, as illustrated in FIG. 5 more clearly, a carriage 22 having mounted upon it a matrix of writing styli 23. These fine wires are in contact with the dielectric surface 13 of the moving belt and when the stylii are selectively elevated to an electrical potential created to the desired pattern for reproduction of a particular image. In other words, a charge is created across the dielectric layer. As illustrated in FIG. 4 the carriage 22 upon which the stylii are mounted is mounted for movement along a skewed transverse direction 24 so as to provide an effective perpendicular line of writing across belt 10 as it moves in the direction shown by the arrow 10'.

Develop station 17 includes a toner supply 26 which contains the mixture of a resinous pigment of the desired color and a carrier such as iron filings. Magnetic brush 27 is mounted within the container 27 and brushes against the belt 10 and rotates in an opposite direction to the movement of the belt as shown by the arrow. By a well-known technique, the charged particles of toner are attracted from the brush to the moving belt by electrostatic force along lines of electrostatic difference. As a result of this attraction the electrostatic pattern provided at write station 16 is replicated by a charged resin particulate.

Next, in the printing station 18, a roller 28 is biased against roller 12 with the printing medium or continuous sheet of paper 29 passed between and continuously moved. Hot roller 12 includes a pair of heating elements 31 which serve to heat the belt 10 to a point above the melting point of resin but below the kindling point of the paper. Since the coefficient of adhesion of the TEF- LON layer is low compared to the coefficient of adhesion of the paper 29 the resin image adheres to the paper and is totally transferred from the coated belt. Thus with the use of the hot roller 12 the developed image is transferred from the moving belt to the paper 29 in a continuous manner. At the same time because of the high temperature the image is fixed. Thereafter, the belt is cooled by the cold roller 11 which may be cooled by either air or any other convenient means and the resin removed from the belt at cleaning station 19 by a continuously rotating brush 32. Thus, the process is completed.

Figure 6:
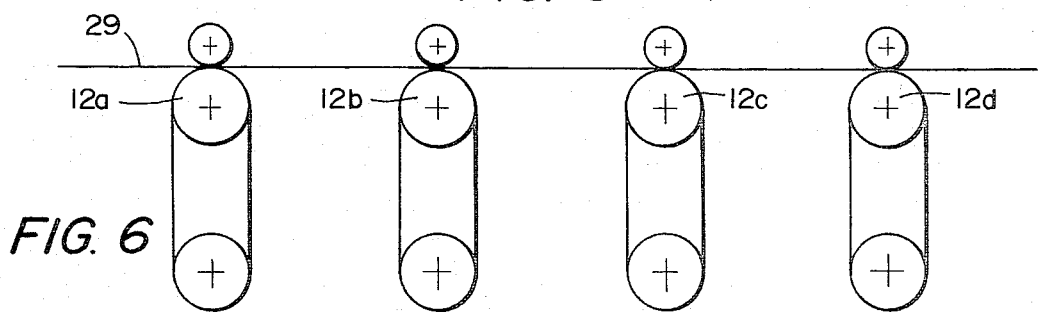
FIG. 6 is an elevational view showing apparatus similar to FIG. 3 but in an alternative embodiment.

Because of the conductive layer 14, other techniques for heating the belt other than the heater 31 contained in roller 21 may be used. For example, an eddy current heater may be utilized in proximity to the belt 10 after the application of the toner to heat the layer 14 and thus the belt to an adequate temperature.

Where it is desired to print multiple colors a number of the systems of FIG. 3 are provided as illustrated in FIG. 6 as shown by the hot rollers 12a through 12d over all of which pass a common sheet paper 29. Each of the rollers 12a–12d would have associated with it a resin or a particular color. Thus, with the embodiment of FIG. 6 full four color printing is possible.

Another technique for multiple colors is the use of multiple polarity resins where one color is given a positive polarity and the other a negative polarity. This could also be used in conjunction with either FIGS. 3 or 6.

Figure 7:
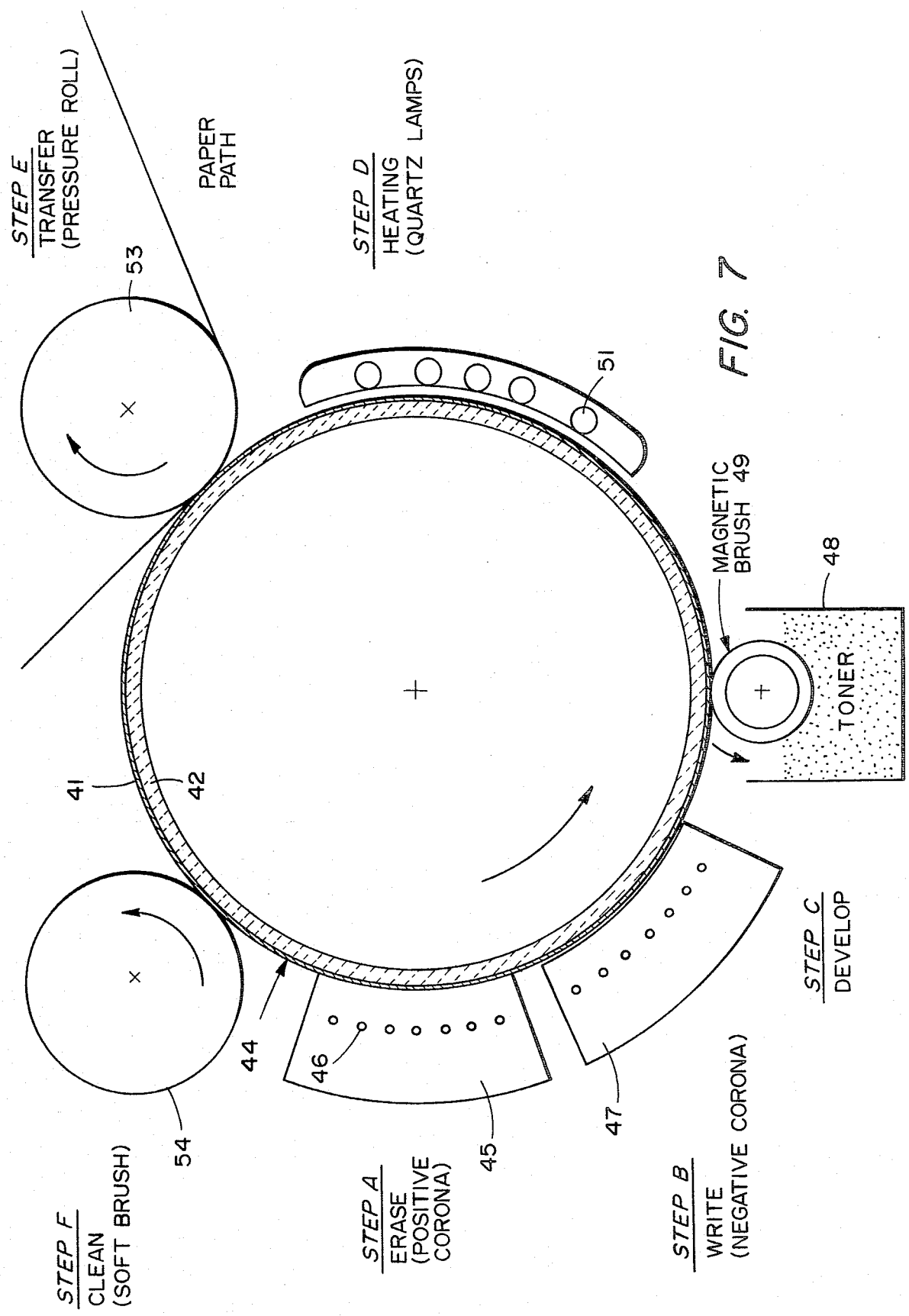
FIG. 7 is a diagrammatic view of a mechanism for accomplishing another embodiment of the invention.

Another embodiment of the invention illustrated in FIG. 7 rather than using a belt 10, includes a cylindrical drum 41 which is essentially made of a PYREX (a trademark) type glass material which has a high dielectric constant with poor thermal conduction, indicated at 42. On the external surface of the PYREX base 42 is a conductive layer of for example copper material and an insulative layer of for example TEFLON. These are indicated as 43 and 44 respectively in FIG. 11.

Referring again to FIG. 7, the printing steps are listed as steps A through F and are somewhat similar to the steps illustrated in FIG. 1. In step A, which is an erase step, a positive corona unit 45 is used to charge the insulated surface 44 of the drum 41 with uniformly distributed electrostatic charge of for example a positive 500 volts. A series of corona wires 46 are illustrated which would have a voltage of 500 volts applied to them. In step B, a writing head 47, which will be explained in greater detail below, discharges selected portions of the positive charge to form an electrostatic image. In step C, the "develop" step, a toner container 48, which of course includes iron powder, has a magnetic brush 49 rotating in it to carry toner to the drum to allow it to be attracted to portions of the drum which have a potential gradient or lines of electrostatic difference. This magnetic brush is well known in the art and may consist of a series of donut type magnets which are polarized along their axes, and stacked along the axis with the poles opposing each other. Magnetic brush 49 of course rotates in an opposite direction from drum 41 as indicated by the arrows.

In step D, quartz lamps 41 heat the positive toner so that it will properly fix and transfer to the paper 52 shown in Step E. This occurs because of course the coefficient of adhesion of the paper is much greater than the TEFLON layer 44. Heating of the toner material and insulative layer is also aided by the fact that the quartz lamps will heat the copper layer which backs the TEFLON layer. Other forms of heating, as in the previous embodiment, could also be used such as eddy current heating.

In step E, a transfer roller 53 provides pressure between the paper 52 and the toner which has been heated on the drum 41 to transfer the toner to the paper 52 to thus place a final image on the paper.

Lastly, in step F, a cleaning brush 54 removes any remaining toner from drum 41 and the process is again repeated.

The writing head 47 of step B of FIG. 7 is shown in greater detail in FIG. 8 and consists of an air chamber 56 into which ambient air is pumped by a low pressure pump 55 and which has an insulative or non-conductive plate 57 with several perforations 58. These provide ionized air jets which impinge upon rotating drum 41. In actual practice, the clearance between the drum and the plate would be approximately 0.002 inch. These apertures or perforations 58 have a diameter of approximately 0.004 inch. Ambient air enters through the inlet of pump 55 and passes through ionizing electrodes 59 where negative ions are produced. Then the ionized gas selectively exiting the apertures or perforations 58 as air jets causes the selective discharge of the previously positively charge drum to form an electrostatic image.

FIGS. 9A and 9B illustrate two alternative embodiments of non-conductive plate 57. In the embodiment of FIG. 9A, the plate is actually an insulative printed circuit board. As illustrated, each aperture includes a metallic collar 59 which as illustrated in FIG. 10 are individually connected by means of connectors 61 to a matrix drive unit 62 which sequences through the various rows of perforations shown to provide a desired electrostatic image. For example, a row of perforations 58 might consist of 40 apertures with as many as 35 rows, depending on the printing applications. These would be spaced 0.100 inch from each other, and have a gross diameter of 0.010 inch.

In order to provide such small aperture spacing, an alternative embodiment of FIG. 9B might be more suitable, where the non-conductive plate 57 is an N type silicon wafer. Here, semi-conductive etching techniques are used for forming the perforations 58.

FIG. 11 illustrates the operation of the present invention and shows an enlarged cross-section of the drum 41 where the copper conductive layer 43 is grounded. In actual practice grounding is provided by a brush riding on a rotating end ring of the drum. The relative dimensions of the various components 42, 43 and 44 in FIG. 11 would be the PYREX layer 42, 0.250 inch; the copper plating 43, 0.005 inch; and the TEFLON coating 44, 0.0015 inch. Ionizing electrode 59 which is contained in the write head produces negative ions since the electrode is supplied a negative 500 volts by the battery 63. A switch 64 for each of the conductive collars 59 of the apertures 58 is driven by the matrix drive unit 62 and applies by means of battery 66 a positive 500 volts to selected perforations. Thus there may be either a positive 500 volts at the aperture or, if the switch 64 is open, it will be floating.

If there is a positive 500 volts on the aperture, this is the same effective voltage as the charged surface 44, and thus, the negative ions will tend to stop at the conductive collar 59. In other words, the application of the voltage to conductive collars 59 in effect acts as a gate to close the perforations 58 to not allow any ions to be passed. On the other hand, when that portion of the electrostatic charge on layer 44 adjacent the perforation is desired to be discharged to form, for example a particular letter, the switch is opened and the ions will naturally migrate toward the uniformly charged surface to discharge that portion of the surface which is impinged upon. Thus the invention acts as a matrix type printer which is well known in the art; but this is accomplished by the use of ionized gas jets. With the use of a very closely spaced matrix of perforations 58, a high resolution can be obtained.

In summary, the present printer is ideally suited for electronic control by minicomputer of a microprocessor system. In such an application, an operator would select a pattern to be printed and would designate the number of replications of the pattern required. Thus the operator can "stack" print patterns. This creates the versatility to print forms and labels, etc. under discrete machine control of many different types. The printer could also be used to rapidly print address labels from magnetic tape or disc records.

I claim:

1. Electrostatic imaging apparatus comprising: a member having a surface capable of holding an electrostatic image on its surface; means for applying a substantially uniformly distributed electrostatic charge on said surface; and writing means for creating said electrostatic image including means for providing a selective plurality of ionized gas-jets which discharge impinged upon portions of said uniformly distributed charge including a non-conductive plate having a plurality of perforations and in close proximity to said surface and electrical means individually connected to each perforation for gating said perforations open or closed for selecting which of the perforations will provide an ionized gas-jet.

2. Apparatus as in Claim 1 where said perforated non-conductive plate is a semiconductive wafer.

3. Apparatus as in Claim 1 where said perforated non-conductive plate is a printed circuit type board.

4. Apparatus as in Claim 1 where said proximity or said plate to said surface is of the same order of magnitude as the diameter of said perforations.

5. Apparatus as in Claim 1 where said electrical means includes means for applying to a perforation a voltage equivalent to said electrostatic charge on said surface to effectively gate such perforation closed.

6. Apparatus as in Claim 5 where said electrical means includes means for allowing a perforation to electrically float to effectively gate open such perforation.

7. Apparatus as in claim 1 where said writing means includes means for producing ions, where said perforations of said non-conductive plate are in proximity to said ion producing means and where said electrical means for gating selects which of the perforations will allow the passage therethrough of said ions from said ion producing means to provide an ionized gas jet.

* * * * *